Dec. 15, 1970  N. G. ANDERSON  3,547,547
ANALYTICAL PHOTOMETER WITH MEANS FOR MEASURING, HOLDING
AND TRANSFERRING DISCRETE LIQUID VOLUMES
AND METHOD OF USE THEREOF
Filed March 13, 1969  3 Sheets-Sheet 1

INVENTOR.
Norman G. Anderson
BY
ATTORNEY.

Dec. 15, 1970    N. G. ANDERSON    3,547,547
ANALYTICAL PHOTOMETER WITH MEANS FOR MEASURING, HOLDING
AND TRANSFERRING DISCRETE LIQUID VOLUMES
AND METHOD OF USE THEREOF
Filed March 13, 1969    3 Sheets-Sheet 3
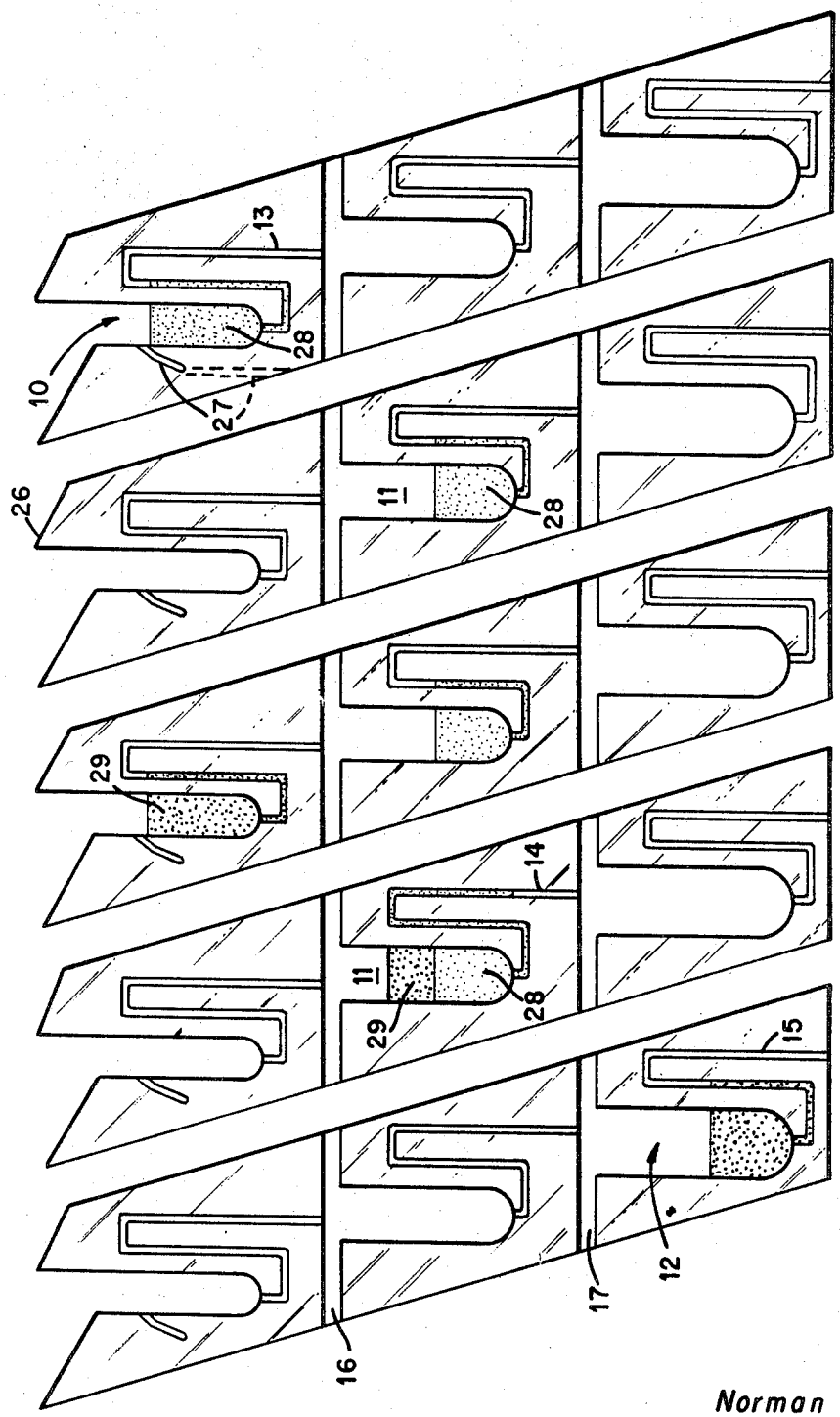
INVENTOR.
Norman G. Anderson
BY
ATTORNEY.

United States Patent Office 3,547,547
Patented Dec. 15, 1970

3,547,547
ANALYTICAL PHOTOMETER WITH MEANS FOR MEASURING, HOLDING AND TRANSFERRING DISCRETE LIQUID VOLUMES AND METHOD OF USE THEREOF
Norman G. Anderson, Oak Ridge, Tenn., assignor to the United States of America as represented by the United States Atomic Energy Commission
Filed Mar. 13, 1969, Ser. No. 806,920
Int. Cl. G01n 1/10, 21/24
U.S. Cl. 356—197                                11 Claims

ABSTRACT OF THE DISCLOSURE

An analytical photometer is provided for simultaneously determining the presence of a common substance in a multiplicity of discrete samples. Three sets of cavities are disposed in concentric annular arrays in a disc which is adapted to rotate about its central axis. The radially outermost set of cavities constitutes a rotary cuvette system. Each cavity is provided with siphon means for liquid removal and transfer to cavities in sets located further outward radially, or to a collecting trough in the case of the radially outermost cavity set. Air pressure applied through a central opening and/or vacuum applied through the collection trough is used to activate the siphon means to effect liquid transfer from the cavities. A method is described for loading, measuring, mixing and unloading liquids in the cavities under dynamic conditions.

BACKGROUND OF THE INVENTION

The invention described herein relates generally to photometers and more particularly to a photometer for simultaneously determining the presence of a common substance in a multiplicity of discrete samples and having means of measuring, holding and transferring liquid volumes without the need for individual manual operations. It was made in the course of, or under, a contract with the U.S. Atomic Energy Commission.

The need for a photometric system capable of rapidly performing analyses on a large number of discrete samples has long existed in clinical and analytical laboratories. Qualitative and quantitative measurements of metabolites, hormones, vitamins, enzymes, minerals, body waste products, bile constituents and gastric contents are made daily in great numbers in such laboratories in the diagnosis of disease as well as for research purposes. A system which can perform measurements of this type rapidly, accurately and cheaply will effect large manpower and cost savings while providing improved results. Most prior art instruments are capable of performing analyses only in sequence rather than simultaneously. Not only does sequential analysis limit the analytical production, but in the case of analyzing very small samples, the analytical results are usually unreliable. Another deficiency common in prior art, discrete sample analyzers is the requirement that samples for photometric analysis be prepared in many time-consuming steps in several entirely separate machines. Such an arrangement further limits analytical production by causing it to be even more time-consuming and expensive.

Still another deficiency in many prior art photometric instruments is that volumes of samples, enzymes and other expensive reagents larger than desirable are required. This deficiency is in some cases the result of continuous flow monitoring systems which are inefficient when small numbers of samples are analyzed. A further deficiency is the undesirability of handling many small, discrete volumes of samples and reagents individually and mixing them at timed intervals.

One device which was designed to obviate the above-described deficiencies is described in copending patent application of common applicant and assignee, S.N. 784,739. In that device a central transfer disc is provided for receiving sample constituents prior to operation. An annular array of cuvettes is disposed about the transfer disc for receiving the sample liquid from the transfer disc and holding it for photometric analysis. Rotation of the transfer disc and cuvettes causes the sample constituents to flow from the transfer disc to the cuvettes where they are photometrically analyzed while the entire system of transfer disc and cuvettes is rotating. Individual hand loading of sample components in the transfer disc is performed while the disc is held stationary. Unloading of the cuvettes also requires a time-consuming operation involving stopping the rotor and flushing out the individual cuvettes. Where later mixing with additional liquid components is desired, the transfer disc and cuvettes must be stopped from rotating, the transfer disc replaced with a new disc containing the desired additional components, and the system reaccelerated to effect the second transfer. Thus, although a significant advance is achieved in that a number of photometric analyses can be performed simultaneously, a number of undesirable, time-consuming manual operations are still required during the loading and unloading steps.

It is, accordingly, a general object of the invention to provide a photometric system capable of performing rapid analyses on a large number of discrete samples.

Another object of the invention is to provide a photometric system wherein the steps of volumetric measurement, liquid transfer, solution mixing, reaction, photometric measurement, and data reduction may be performed within a single system without time delays caused by individual hand loading and unloading operations.

Other objectives of the invention will be apparent from an examination of the following description of the invention and the appended drawings.

SUMMARY OF THE INVENTION

In accordance with the invention, a photometer is provided which is capable of measuring, holding and transferring a multiplicity of discrete samples without requiring individual hand operation. Two or more sets of cavities are disposed in concentric annular arrays in a disc which is adapted to rotate about its central axis. Each cavity is provided with siphon means for transferring liquid to cavities located in sets disposed radially outward therefrom, or to a collection trough in the case of the radially outermost set of cavities. Air pressure and/or vacuum applied through openings in the disc are used to activate the siphons and thereby cause liquid transfer from the cavities. Cavities within the radially innermost set of cavities are provided with overflow means to permit volumetric measurement. Succeeding sets of cavities disposed at increasing radii are used for mixing and for analyzing samples which are transferred between sets of cavities by activating the siphon means with air pressure and/or vacuum. Hence a system is provided wherein measuring, mixing and photometric analysis operations may be performed on a multiplicity of discrete samples simultaneously and without the need for time-consuming manual loading and unloading operations.

BRIEF DESCRIPTION OF THE DRAWINGS

FIGS. 3, 4, 5, 6 and 7 schematically illustrate the operation of the disc of FIG. 2 in measuring, mixing and holding samples.

DESCRIPTION OF THE PREFERRED EMBODIMENT

Figure 1:
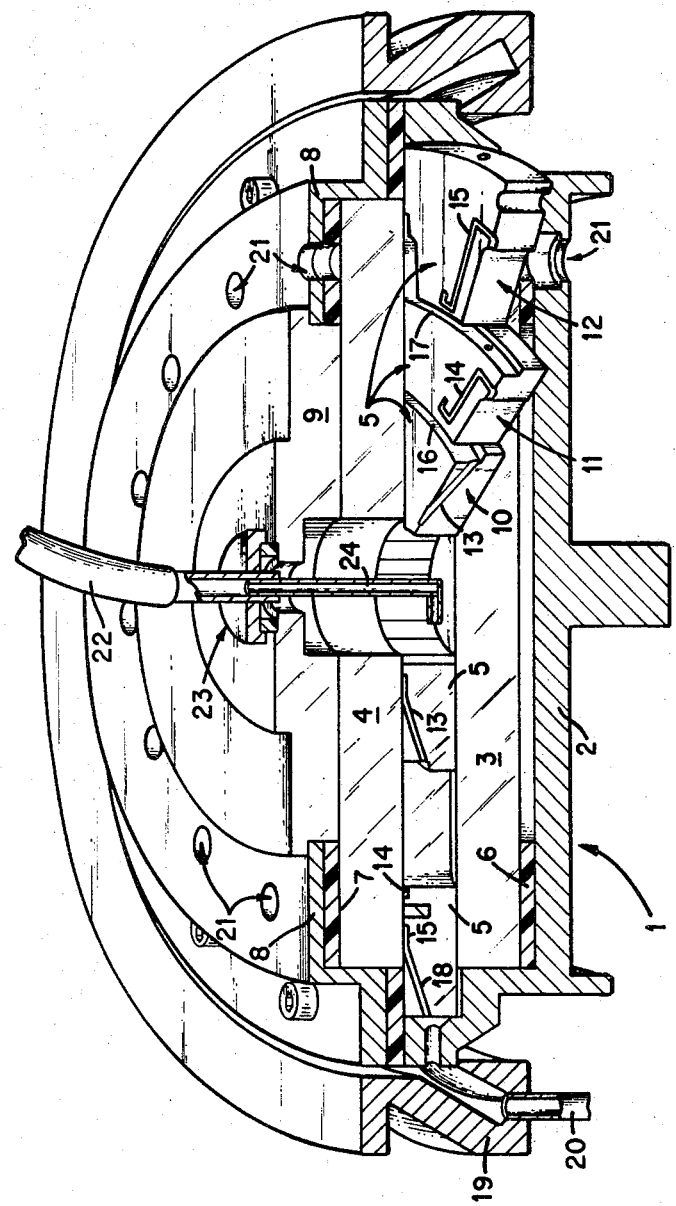
FIG. 1 is an isometric view, partly sectioned, of an analytical photometer made in accordance with the invention.

FIG. 1 illustrates a photometric analyzer made in accordance with the invention. A pancake-shaped rotor assembly 1 comprises a bolt flanged steel rotor body 2, glass plates 3 and 4, a clear plastic liquid transfer, measuring and holding disc 5, polytetrafluorethylene retaining rings 6 and 7, a steel bolted flange ring 8, and a clear plastic top closure plate 9. Plates 3 and 4, disc 5, and retaining rings 6 and 7 are compressed between rotor body 2 and flange ring 8 to form three sets or registers of cavities 10, 11 and 12 arranged in concentric annular rings at increasing rotor radii. Siphons 13, 14 and 15, in the form of grooves and channels in disc 5, extend from the cavities in sets 10, 11 and 12 to siphon discharge headers 16 and 17 and radial passageways 18 extending through rotor body 2. The spacing and orientation of cavity sets 10, 11 and 12, siphons 13, 14 and 15, and other features of disc 5 are further illustrated in the plan view of FIG. 2 which will be discussed below. Reference numerals 10, 11 and 12 are used interchangeably to identify cavities individually or collectively as sets of cavities. A stationary collection trough 19 and drain 20 surround rotor assembly 1 at its radial periphery in order to receive liquid discharged through siphons 15 and passageways 18 during an unloading operation.

The outermost set of cavities 12 is designed to operate as a rotary cuvette system permitting simultaneous photometric analysis of a multiplicity of discrete samples. To facilitate such analysis, a multiplicity of spaced apart holes 21, axially aligned with cavities 12, are provided in rotor body 2, retaining rings 6 and 7, and flange ring 8 thereby providing axially extending passageways permitting passage of a light beam through cavities 12. Clear glass plates 3 and 4 permit light passage through the remaining part of the rotor assembly. A system of photometric light source, photodetecting means and other electronic components suitable for use with the rotor assembly described above is described in copending application of common applicant and assignee S.N. 784,739. Those components will not be described here inasmuch as the invention in this case is an improvement restricted to the design of the rotor assembly and its method of use and does not encompass the associated external electronic components described in the copending application.

As shown in FIG. 1, a centrally located tube 22, for inserting sample components and applying air pressure to activate the siphons located in disc 5, passes through a seal 23 in fluid communication with a stationary feed nozzle 24. Nozzle 24 is axially centered with respect to disc 5 so as to discharge against the inner serrated edge of the rotating disc, thereby supplying a substantially uniform amount of sample components to cavities 10. The inner serrated edge of disc 5 and the orientation of cavities 10 are more clearly illustrated in the plan view of disc 5 shown in FIG. 2.

Figure 2:
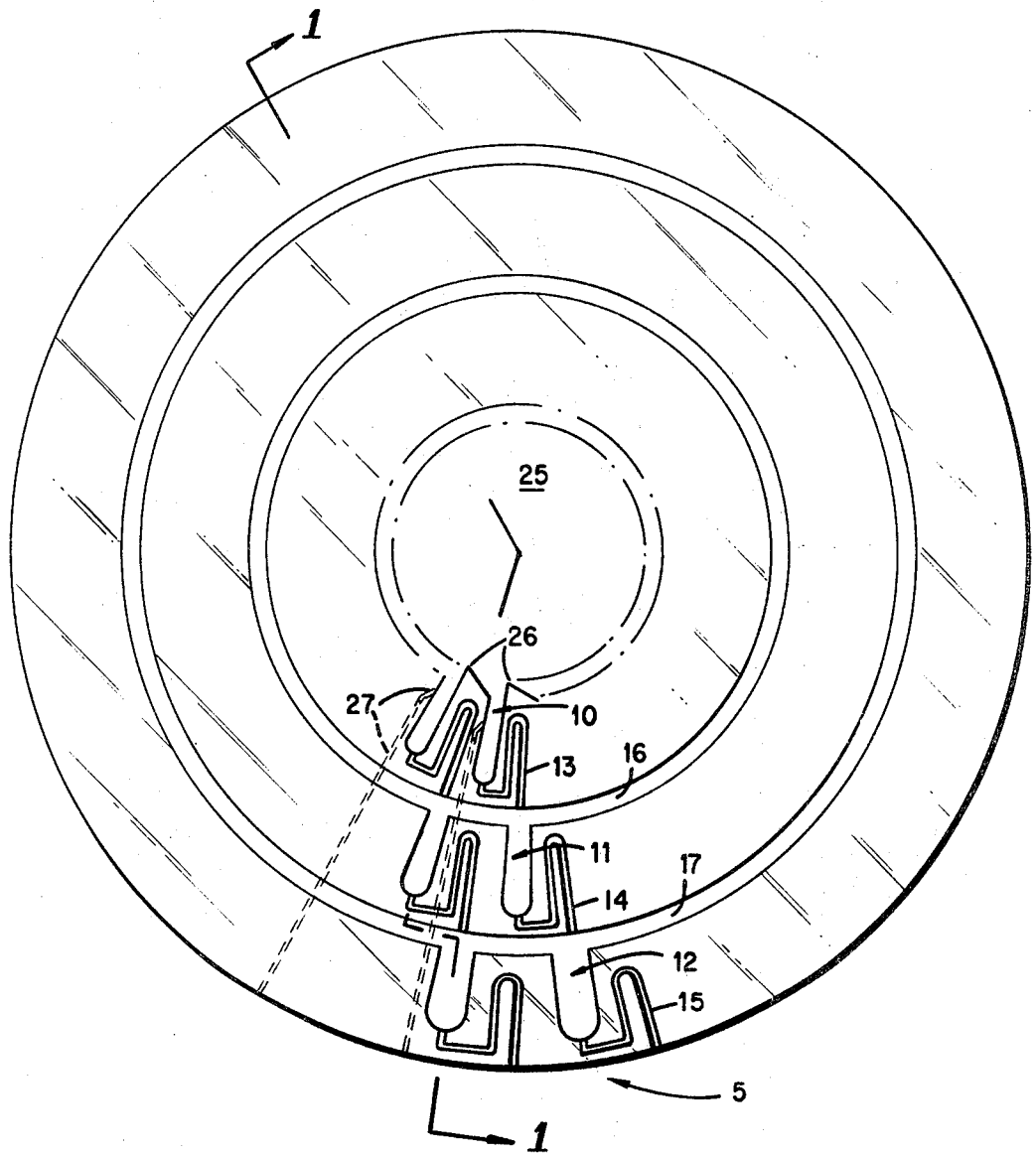
FIG. 2 is a schematic plan view of a liquid transfer, measuring and holding disc made in accordance with the invention and incorporated in the photometer of FIG. 1.

Referring now to FIG. 2 where a plan view of disc 5 is schematically shown, only two of eighteen cavities in each set or register of cavities are shown. Three sets of cavities 10, 11 and 12 are illustrated although more or less sets could be used without departing from the scope of the invention. A central liquid distribution chamber 25 is provided with a serrated periphery 26 to cause liquid fed therein to be substantially equally distributed into volumetric measuring cavities 10 when disc 5 is rotating. Overflow channels 27 open from the side wall of each cavity 10 and pass through disc 5 to any suitable discharge point such as collection trough 19 shown in FIG. 1. Other overflow collecting means such as a separate collection trough below disc 5 could be provided if desired.

As shown the cavities in each set of cavities are angularly displaced with respect to cavities in adjacent sets disposed at greater radial distances from the rotor center. This arrangement results from the use of siphons 13, 14 and 15 which discharge at a point angularly removed from the cavities which they drain. Thus, the cavities in set 11 are angularly displaced to be in radial alignment with the discharge points of siphons from corresponding cavities in set 10. Siphons 13, 14 and 15 are shown lying entirely on the surface of disc 5 in FIG. 2 to simplify understanding of their operation. In FIG. 1 they are shown passing through disc 5 so as to discharge closer to the center of respective cavities in adjacent sets of cavities. Means (not shown) may be provided for applying air pressure or vacuum to siphon discharge headers 16 and 17 to facilitate siphon activation and sample mixing as described in reference to FIGS. 3 through 7. The central cavity defining liquid distribution chamber 25 may be enlarged to hold a removable transfer disc, as described in copending application of common applicant and assignee S.N. 784,739, for holding measured or unmeasured sample volumes. In that case rotation would effect transfer of the sample volumes from the transfer disc to cavities 10. The transfer disc would then be removed and reagents added in accordance with the method described in reference to FIGS. 3 through 7.

Operation of the invention may best be understood by reference to FIGS. 3 through 7 where a diagonal segment of disc 5 is shown repeatedly to illustrate successive operating steps. In step 1 as illustrated in FIG. 3, a first liquid 28 is fed through the central distribution chamber against serrated periphery 26 causing cavity 10 to fill to the level of overflow channel 27. Air pressure is then applied to the distribution chamber to activate siphon 13 and empty first liquid 28 out of cavity 10 into larger cavity 11, as shown in FIG. 4. In step 3 illustrated in FIG. 5, a second liquid 29 is caused to fill cavity 10 in the same manner as described in reference to step 1. In step 4 illustrated in FIG. 6, the second liquid 29 is then caused to empty into cavity 11 with the first liquid using the same technique described in reference step 2. In step 5 illustrated in FIG. 7, air pressure is applied to siphon discharge header 16 so as to activate siphon 14 and cause the liquids to transfer to cavity 12 which holds the liquids for photometric analysis. Additional liquids may be added if desired by simply repeating the above-described procedure. Cavities 10, 11 and 12 are made successively larger to accommodate the mixing and analysis of several sample components. Mixing can be facilitated by reducing the air pressure inside header 17 with respect to external air pressure so as to cause air to pass through siphon 15 and bubble inward through the liquids in cavity 12. Following a photometric measurement, cavity 12 may be unloaded by applying air pressure through header 17 and/or vacuum to collection trough 19 which acts as a discharge header for siphon 15. The cuvette system described in copending application S.N. 784,739 may be modified to unload in accordance with the teaching of this invention by providing a collection trough around the rotor periphery and siphons similar to siphons 15 described herein in communication with each of the cuvette cavities. A cover plate similar to plate 9 and an air inlet to activate the siphons would complete the modification.

The above description of one embodiment of the invention is offered for illustrative purposes only and should not be interpreted in a limiting sense. For example, disc 5 may be fabricated with more or less cavities or sets of cavities which may also vary in relative size. Also, the siphons shown were disposed in part on the face of disc 5 because of fabrication exigencies and could be disposed in a wide variety of positions and orientations without adversely affecting their operation. It is intended, rather, that the invention be limited only by the scope of the claims appended hereto.

What is claimed is:
1. In a photometric solution analyzer for the simultaneous determination of a common substance in a multiplicity of discrete samples apparatus for handling said samples comprising:
   (a) a power driven rotor assembly defining:
      (1) at least one set of radially oriented cavities disposed in an annular array, said at least one set of cavities forming a rotary cuvette system for holding samples while they are photometrically analyzed; and
      (2) siphon means communicating with each of said cavities in said at least one set of cavities; and
   (b) means for activating said siphons causing them to empty at least one of said sets of cavities while said rotor assembly is rotating.

2. In a photometric solution analyzer for the simultaneous determination of a common substance in a multiplicity of discrete samples apparatus for handling said samples comprising:
   (a) a power driven rotor assembly defining:
      (1) at least two sets of radially oriented cavities disposed in concentric annular arrays, the radially outermost set of said cavities forming a rotary cuvette system for holding samples while they are photometrically analyzed; and
      (2) siphon means communicating with each of said cavities in said at least two sets of radially oriented cavities;
   (b) means for inserting sample components into the radially innermost set of said cavities; and
   (c) means for activating said siphons causing them to empty at least one of said sets of cavities while said rotor assembly is rotating.

3. The apparatus of claim 2 wherein said siphon means provide liquid communication between said at least two sets of radially oriented cavities.

4. The apparatus of claim 2 wherein a collection trough is disposed about the radial periphery of said rotor assembly, and wherein said siphon means communicating with the radially outermost set of said cavities discharge into said collection trough.

5. The apparatus of claim 2 wherein cavities in the radially innermost set of said cavities are provided with individual overflow passageways which permit the use of said cavities for liquid measurement purposes.

6. The apparatus of claim 2 wherein a central liquid distribution chamber is provided adjoining the centripetal edge of the radially innermost set of said cavities, and wherein said chamber has a serrated periphery for causing liquid fed therein to be substantially equally distributed to cavities in said innermost set when said rotor assembly is rotating.

7. The apparatus of claim 2 wherein three sets of said radially oriented cavities are disposed in concentric annular arrays.

8. In a photometric solution analyzer for the simultaneous determination of a common substance in a multiplicity of discrete samples apparatus for handling said samples comprising:
   (a) a power driven rotor assembly defining:
      (1) three sets of radially oriented cavities disposed in concentric annular arrays of increasing diameter, cavities within the radially innermost set of said cavities being provided with individual overflow passageways to facilitate measuring discrete volumes therein, cavities within the radially outermost set of said cavities forming a rotary cuvette system for holding samples while they are photometrically analyzed; and
      (2) first siphons communicating with individual cavities within said radially innermost set of cavities, said first siphons being adapted to discharge into respective individual cavities within a radially intermediate set of said cavities; second siphons communicating with individual cavities within said radially intermediate set of cavities, said second siphons being adapted to discharge into respective individual cavities within said radially outermost set of cavities; and third siphons communicating with individual cavities within said radially outermost set of cavities, said third siphons being adapted to discharge into a collection trough;
   (b) a central liquid distribution chamber adjoining the centripetal edge of said radially innermost set of cavities, said chamber having a serrated periphery for causing liquid fed therein to be substantially equally distributed to cavities in said innermost set when said rotor assembly is rotating; and
   (c) means for activating said siphons causing them to empty at least one of said sets of cavities.

9. The apparatus of claim 8 wherein cavities within said radially intermediate and radially outermost sets of cavities are larger than cavities within said radially innermost set of cavities.

10. In a method for photometrically analyzing a multiplicity of discrete samples to determine the presence of a single substance therein, the steps for handling said sample comprising:
   (a) introducing a first liquid into a first set of cavities within a rotor assembly while said rotor assembly is rotating, said first set of cavities being of precise dimensions and equipped with overflow means causing them to retain preselected volumes of liquid;
   (b) transferring said first liquid from said first set of cavities to a second set of cavities located radially from the center of rotation of said rotor assembly a greater distance than said first set of cavities, cavities within said second set of cavities being larger than cavities within said first set;
   (c) introducing a second liquid into said first set of cavities while said rotor assembly is rotating;
   (d) transferring said second liquid from said first set of cavities to said second set of cavities;
   (e) transferring said first and second liquids from said second set of cavities to a third set of cavities located radially from the center of rotation of said rotor assembly a greater distance than said second set of cavities.

11. The method of claim 10 wherein more than two liquids are introduced into said first set of cavities and transferred to said third set of cavities.

References Cited

FOREIGN PATENTS 1,145,388  3/1963  Germany.

RONALD L. WILBERT, Primary Examiner

O. B. CHEW II, Assistant Examiner

U.S. Cl. X.R.

250—218; 356—246